(12) United States Patent
Yu et al.

(10) Patent No.: US 12,318,853 B2
(45) Date of Patent: Jun. 3, 2025

(54) DUSTLESS MITER SAW

(71) Applicant: Lisheng Yu, Stafford, TX (US)

(72) Inventors: Lisheng Yu, Stafford, TX (US); Alick Tin Heng Yu, Missouri City, TX (US)

(73) Assignee: Lisheng Yu, Stafford, TX (US)

( * ) Notice: Subject to any disclaimer, the term of this patent is extended or adjusted under 35 U.S.C. 154(b) by 48 days.

(21) Appl. No.: 17/223,737

(22) Filed: Apr. 6, 2021

(65) Prior Publication Data

US 2022/0314348 A1   Oct. 6, 2022

(51) Int. Cl.
*B23D 59/00*   (2006.01)
*B27B 5/20*    (2006.01)
*B27B 5/29*    (2006.01)
*B27G 19/02*   (2006.01)

(52) U.S. Cl.
CPC ............ *B23D 59/006* (2013.01); *B27B 5/207* (2013.01); *B27B 5/29* (2013.01); *B27G 19/02* (2013.01)

(58) Field of Classification Search
CPC ......... B27B 5/207; B27B 5/29; B23D 59/006; B26B 5/207; B26B 5/29
See application file for complete search history.

(56) References Cited

U.S. PATENT DOCUMENTS

| | | | | |
|---|---|---|---|---|
| 2,399,239 A | * | 4/1946 | Martin | B24B 27/06 29/DIG. 60 |
| 2,574,161 A | * | 11/1951 | Charles, V | B23Q 11/0046 406/100 |
| 2,839,102 A | * | 6/1958 | Kido | B23Q 11/0046 144/252.2 |
| 3,103,069 A | * | 9/1963 | Gary | B23D 61/025 30/392 |
| 3,267,974 A | * | 8/1966 | Elson | B23Q 11/005 30/377 |
| 3,481,036 A | * | 12/1969 | Slaughter | B23D 30/124 30/124 |
| 3,805,639 A | * | 4/1974 | Peter | B23Q 11/06 83/860 |
| 3,882,598 A | * | 5/1975 | Earle | B23D 59/006 269/21 |
| 4,022,182 A | * | 5/1977 | Lenkevich | B23Q 11/0046 30/390 |
| 4,150,598 A | * | 4/1979 | Berends | B27G 19/02 83/544 |

(Continued)

*Primary Examiner* — Sean M Michalski
(74) *Attorney, Agent, or Firm* — McCutcheon Joseph, PLLC

(57) ABSTRACT

A dustless compound sliding miter saw with a built-in dust collection system is disclosed. The dustless compound sliding miter saw uses an extraction turbine to create a vacuum region at the end of the blade exist from the cut wood piecework, the blade housing has an external extraction channel and an external suction tube to maximize the dust collection. A retractable dust guard is utilized to confine the sawdust in the vacuum region to further maximize the dust collection. The compound sliding miter saw also utilizes anti-dust blade guard and air flow guide fins to optimize the airflow and the dust extraction. The compound sliding miter saw has a rail system that slides the blade from front to back and extends the maximum cutting length. The compound sliding miter saw has a built-in beveling mechanism to tile the blade and cut down through the wood at an angle.

20 Claims, 8 Drawing Sheets

(56) References Cited

U.S. PATENT DOCUMENTS

| | | | | |
|---|---|---|---|---|
| 4,253,362 A * | 3/1981 | Olson | B23D 59/006 | 83/100 |
| 4,281,457 A * | 8/1981 | Walton, II | B23Q 5/06 | 30/124 |
| 4,422,239 A * | 12/1983 | Maier | B23Q 11/0046 | 30/124 |
| 5,190,217 A * | 3/1993 | Black | B05B 7/1495 | 239/526 |
| 5,287,779 A * | 2/1994 | Metzger, Jr. | B27G 19/02 | 83/486.1 |
| 5,445,056 A * | 8/1995 | Folci | B23Q 11/0046 | 83/100 |
| 5,452,515 A * | 9/1995 | Schilling | B27B 9/02 | 30/376 |
| 5,613,269 A * | 3/1997 | Miwa | A47L 5/14 | 15/346 |
| 5,766,063 A * | 6/1998 | Hazenbroek | A22C 21/06 | 452/117 |
| 5,819,619 A * | 10/1998 | Miller | B23Q 11/0042 | 83/100 |
| 5,950,514 A * | 9/1999 | Benedict | B23D 45/042 | 83/478 |
| 6,047,693 A * | 4/2000 | Yamami | B23D 59/006 | 30/124 |
| 6,058,819 A * | 5/2000 | Binder | B23Q 16/028 | 83/477.1 |
| 6,146,094 A * | 11/2000 | Obana | F04D 29/281 | 415/200 |
| 6,167,626 B1 * | 1/2001 | Doumani | H05B 41/392 | 30/390 |
| 6,219,922 B1 * | 4/2001 | Campbell | B23D 59/006 | 30/390 |
| 6,427,570 B1 * | 8/2002 | Miller | B23Q 11/0042 | 83/100 |
| 6,470,778 B1 * | 10/2002 | Kaye, Jr. | B23Q 11/0046 | 83/486.1 |
| 6,833,016 B2 * | 12/2004 | Witter | B04C 5/13 | 55/346 |
| 6,988,435 B2 * | 1/2006 | Kao | B23D 45/048 | 83/486.1 |
| 7,103,979 B2 * | 9/2006 | Yoshida | B23Q 11/005 | 30/376 |
| 7,328,512 B2 * | 2/2008 | Martin | B27B 9/02 | 30/390 |
| 7,526,866 B2 * | 5/2009 | Schnell | B23D 59/006 | D8/66 |
| 7,559,268 B2 * | 7/2009 | Sasaki | B23D 59/006 | 83/100 |
| 7,596,872 B2 * | 10/2009 | Clarke | B23D 57/0076 | 30/388 |
| 7,775,143 B2 * | 8/2010 | Yu | B23D 59/006 | 83/100 |
| 7,789,003 B2 * | 9/2010 | Chen | B23D 45/044 | 83/100 |
| 7,882,771 B2 * | 2/2011 | Sasaki | B23D 59/006 | 83/167 |
| 8,122,799 B2 * | 2/2012 | Kani | B23Q 11/005 | 83/100 |
| 8,459,158 B2 * | 6/2013 | Pierga | B23D 59/003 | 83/100 |
| 8,869,786 B2 * | 10/2014 | Faiweather | B23D 47/025 | 83/477.1 |
| 9,221,110 B2 * | 12/2015 | Guth | B24B 55/04 | |
| 9,427,813 B2 * | 8/2016 | Begin | B23D 59/001 | |
| 9,827,625 B2 * | 11/2017 | Koegel | F16L 27/111 | |
| 9,975,268 B2 * | 5/2018 | Martin | B27G 19/04 | |
| 10,703,008 B2 * | 7/2020 | Martin | B23D 59/006 | |
| 11,331,825 B2 * | 5/2022 | Martin | B23D 59/006 | |
| 11,478,865 B2 * | 10/2022 | Knittle | B27B 27/06 | |
| 11,648,617 B2 * | 5/2023 | Wang | B23D 45/06 | 83/98 |
| 2002/0141836 A1 * | 10/2002 | Ege | B23Q 11/0046 | 408/67 |
| 2004/0093743 A1 * | 5/2004 | Fukuoka | B23D 59/00 | 30/391 |
| 2004/0107584 A1 * | 6/2004 | Yoshida | B23D 59/006 | 30/388 |
| 2006/0185484 A1 * | 8/2006 | Sasaki | B23D 59/006 | 83/486.1 |
| 2007/0101845 A1 * | 5/2007 | Bettacchini | B27G 19/02 | 83/490 |
| 2007/0137452 A1 * | 6/2007 | Oberheim | B23D 45/048 | 83/581 |
| 2008/0011138 A1 * | 1/2008 | Brazell | B28D 7/02 | 83/100 |
| 2008/0163492 A1 * | 7/2008 | Johansson | B23D 59/006 | 30/124 |
| 2009/0249929 A1 * | 10/2009 | Sasaki | B23D 59/006 | 83/100 |
| 2010/0089497 A1 * | 4/2010 | Keenan | B23Q 11/0046 | 409/137 |
| 2010/0269353 A1 * | 10/2010 | Martin | B27B 9/02 | 30/390 |
| 2011/0079207 A1 * | 4/2011 | Guth | B24B 55/04 | 30/124 |
| 2011/0162501 A1 * | 7/2011 | Koegel | B23D 59/006 | 83/100 |

* cited by examiner

DUSTLESS MITER SAW

FIELD OF THE INVENTION

The present disclosure generally relates to an apparatus for wood cutting, more specifically, to a miter saw with a built-in dust extractor for cutting wood or other material workpiece.

BACKGROUND OF THE INVENTION

The miter saw is a power tool widely used to make a quick, accurate crosscut in a workpiece at a variety of angles. Most miter saws are relatively small and portable, with common blade sizes ranging from eight to twelve inches, it is perfect for projects involving crown molding, trim, door frames and more. A compound sliding miter saw gives the users mitering, beveling, and sliding functions.

The power miter saw makes cuts by pulling a spinning circular saw blade down onto a wood workpiece in a short, controlled motion. The high-speed spinning saw usually produces a large amount of sawdust in every direction, which leads the sawdust being spewing out over a wide area of the work site. Even worse, a lot of fine dust is also released into the air. Not only does it pollute the environment, inhalation of the fine dust may also harm the health of the workers.

Miter saw dust collection is tricky because it discharges sawdust in every direction, making it hard to contain. Some solutions have been proposed to get that miter saw mess under control. For example, dust ports and dust collection bags can be found on most miter saws. The dust ports are usually at the back of the blade directing the sawdust into the dust collection bags that hangs off the back or side of the miter saw. They are not particularly helpful as the dust collection is passive pickups, which relies on the initial momentum of the sawdust generated by the blade cutting, and the dust ports have limited opening while the sawdust is discharged in all directions. Even when hooked up to a shop vac at the end of the dust ports, it still leaves a huge mess. To increase the dust collection area, other devices such as miter saw dust collection tents were introduced. A typical miter saw dust collection uses a roller stand with a special clamp to hold this huge dust funnel in exactly the right spot. There are some miter saws on the market equipped with a built-in dust extractor, however, these table saws do not extract dust very well as these saws are not able to contain the sawdust in a limited region, and still leave lots of dust behind.

Therefore, it is desirable to have an improved dust extracting miter saw with capability of mitering, beveling, and sliding functions.

SUMMARY OF THE INVENTION

A new dustless miter saw for cutting wood or other material workpiece is disclosed herein.

In accordance with one embodiment, the dustless miter saw comprises support system, cutting system, and sawdust suction and extraction system. The support system consists of a base, a support arm and a support frame. The cutting system has a blade, a blade driving system with a motor, and a retractable blade guard to protect the user. The sawdust suction and extraction system consists of an extraction turbine, extraction and suction systems and a dust collection bag or box.

In accordance with yet another embodiment, the miter saw uses one motor to drive the blade and the dust extraction turbine. In one embodiment, the blade and the motor are connected using a gear box. In another embodiment, the blade and the motor are connected using a belt. In one embodiment, the turbine is directly mounted onto the motor driving shaft. In another embodiment, the turbine and the motor are connected using a belt or a gear box.

In accordance with yet another embodiment, the miter saw uses one motor to drive the blade and another motor to drive the extraction turbine.

In accordance with another embodiment, the miter saw is equipped with built-in mitering, beveling, and sliding mechanisms to tilt the blade housing and the blade, and to cut at a variety of angles.

BRIEF DESCRIPTION OF THE DRAWINGS

The drawings described herein are for illustrating purposes only of selected embodiments and not all possible implementations and are not intended to limit the scope of the present disclosure. For further understanding of the nature and objects of this disclosure reference should be made to the following description, taken in conjunction with the accompanying drawings in which like parts are given like reference materials, and wherein.

DETAILED DESCRIPTION OF THE EMBODIMENTS

Before explaining the disclosed apparatus and method in detail, it is to be understood that the system and method is not limited to the particular embodiments and that it can be practiced or carried out in various ways. Certain examples are shown in the above-identified FIGS. and described in detail below. In describing these examples, like or identical reference numbers are used to identify common or similar elements. The FIGS. are not necessarily to scale and certain features and certain views of the FIGS. may be shown exaggerated in scale or in schematic for clarity and/or conciseness.

An example dustless miter saw includes a support system, a cutting system, and a sawdust suction and extraction system. The support system includes a base, a support arm and a support frame. The cutting system has a blade, a blade driving system with a motor, and a retractable blade guard to protect the user. The sawdust suction and extraction system includes an extraction turbine, extraction and suction systems and a dust collection bag or box.

To increase the cutting length, a miter saw may include a rail system that slides the blade from front to back. Further, to cut the wood piecework at an angle, the support arm is designed to have an adjustment left and/or right. The miter saw has a built-in beveling mechanism to tile the blade and cut down through the wood at an angle.

Figure 1:
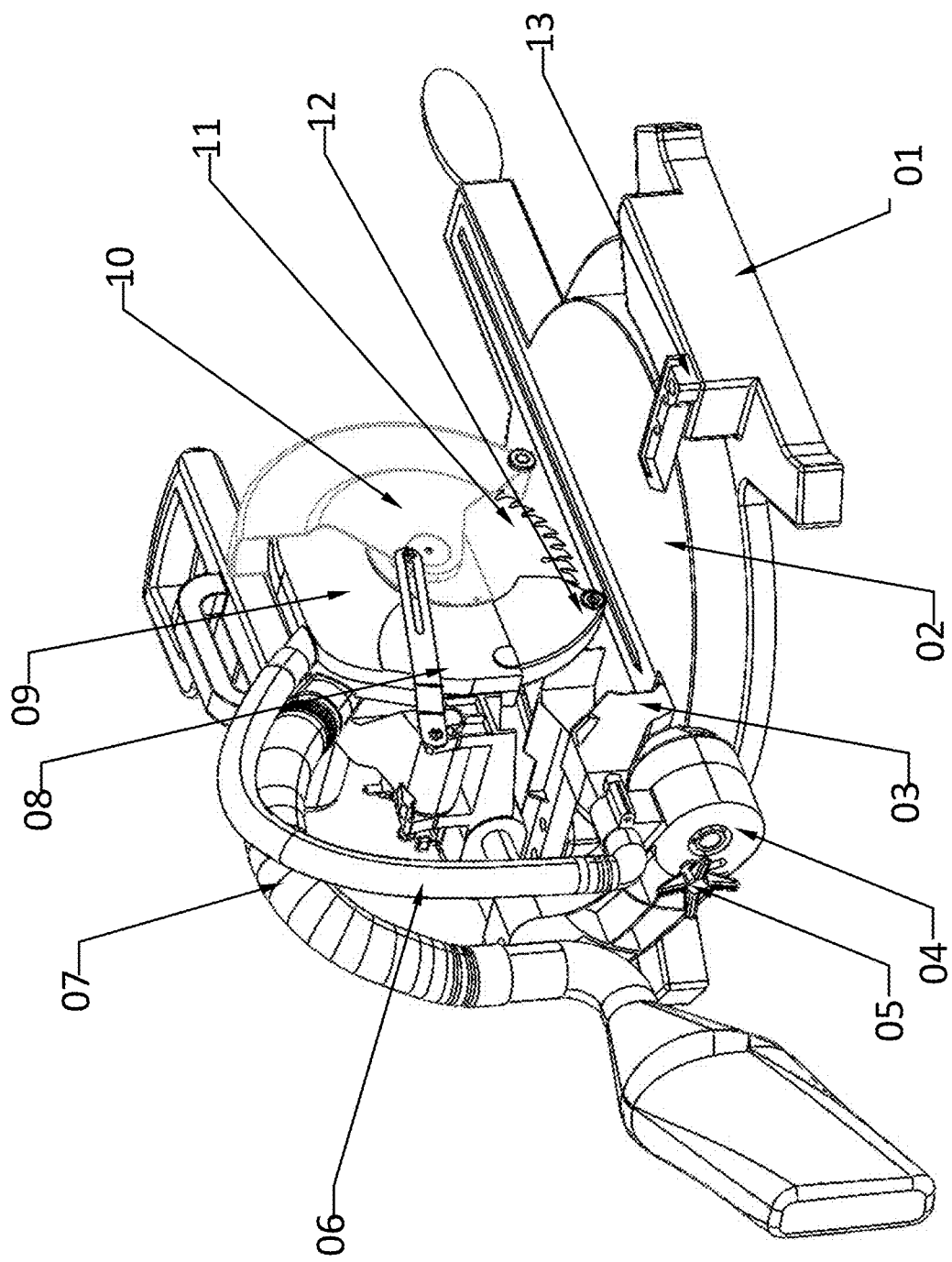
FIG. 1 depicts a side view of the miter saw with a built-in dust extraction system according to one embodiment.
Figure 2:
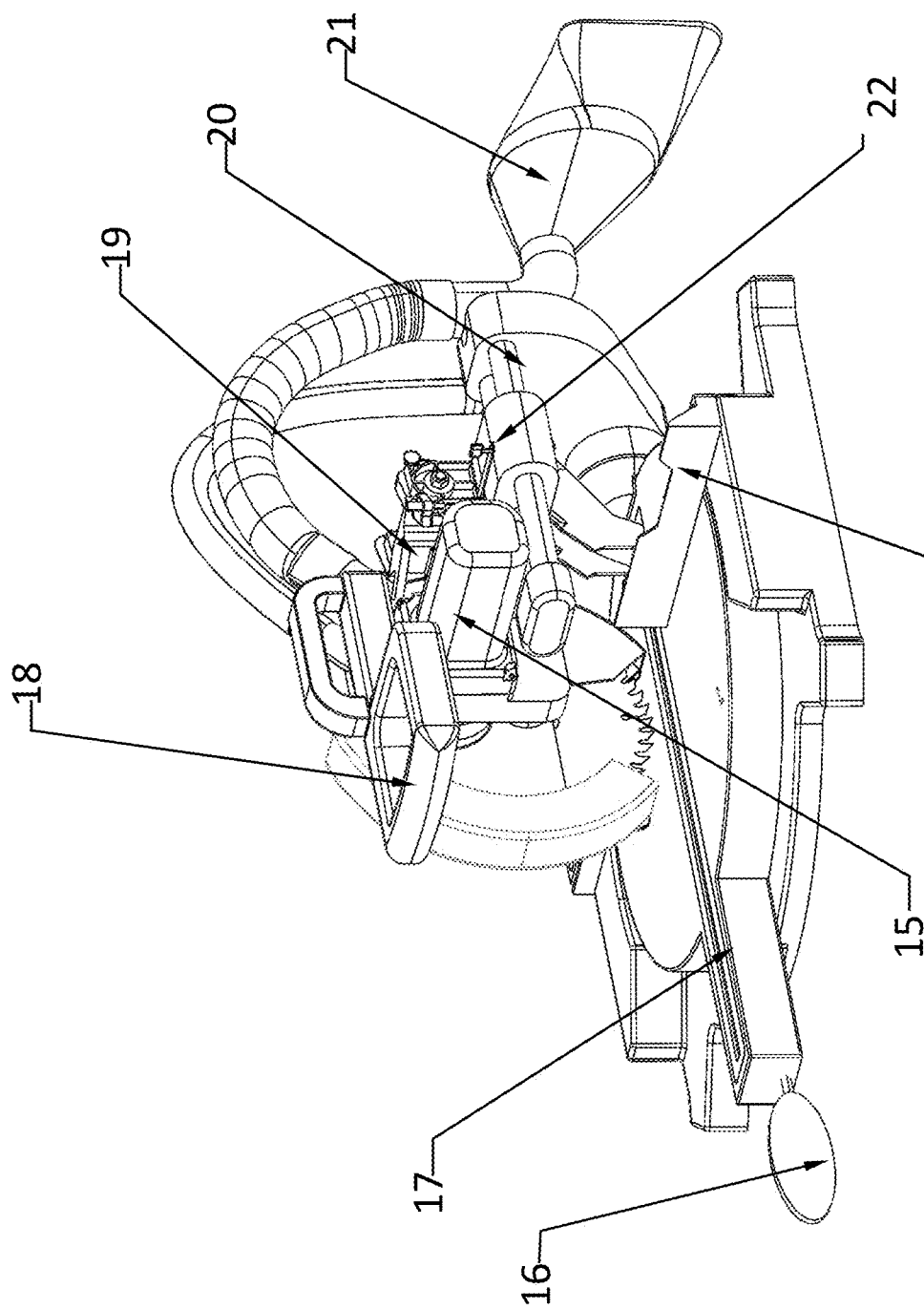
FIG. 2 depicts another side view of the miter saw with a built-in dust extraction system according to one embodiment.

Referring to FIG. 1 and FIG. 2, a miter saw includes a base 01, a saw turn base 02 above the base 01, sliding fences 13, 14 provided on the base 01, a support arm 04 clamped to the turn base 02 using an arm clamp 05, and a base slot cover 17. The base 01 may be made of steels, steel alloys or ductile cast irons, which will lower the system center of gravity, and increase the system stability. The support arm 04 is typically made of aluminum alloys to reduce the overall weight to increase the portability. The miter saw includes a circular blade 11, a blade housing 09, and a retractable blade guard 10. The blade housing 09 is attached to a main support frame 19. A piece of wood, or other material to be cut, is placed on the base 01, and the blade 11 is lowered to make the cut by pushing down a handle 18. A blade guard spring 08 will pull the retractable blade guard 10 when the blade 11 is lowered to cut.

Figure 3:
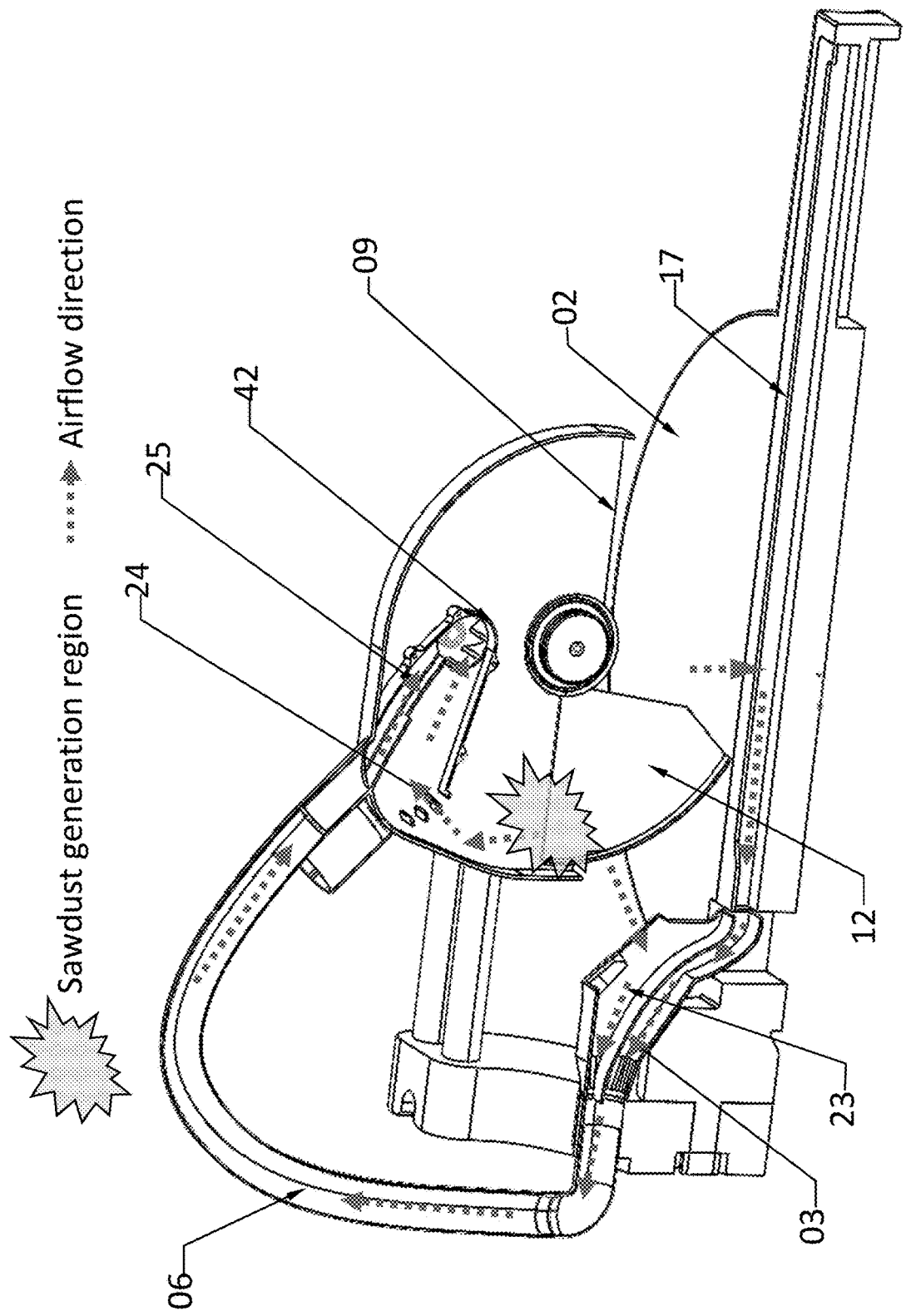
FIG. 3 depicts an embodiment of the built-in dust suction system.
Figure 4:
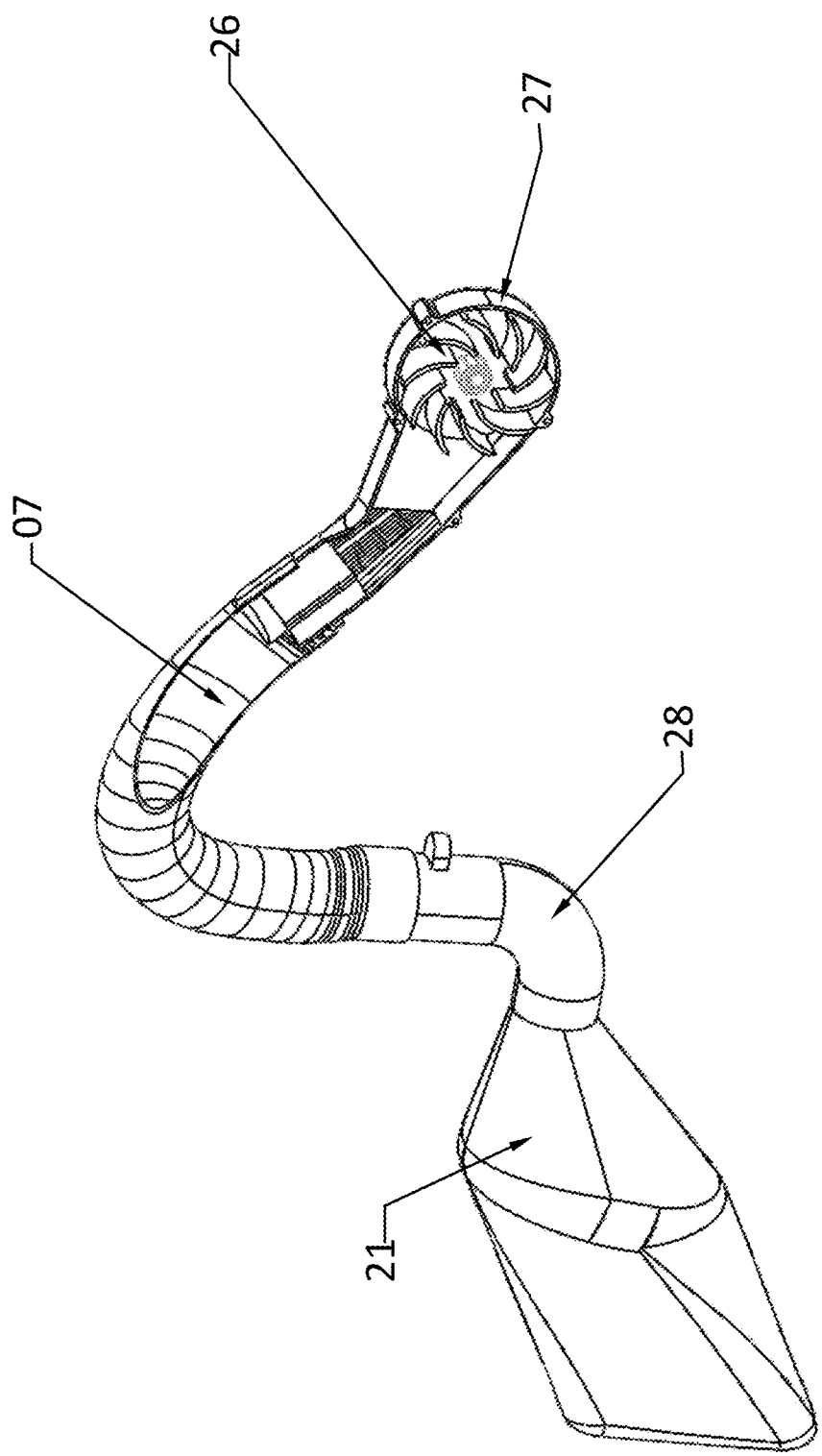
FIG. 4 depicts an embodiment of the built-in dust extraction system.

FIG. 3 and FIG. 4 depict the sawdust suction system and exhaust system, respectively. The sawdust suction system includes a dust suction channel 03 with an integrated channel separator 23, a dust suction tube 06, a retractable dust guard 12, dust flow fins 24, dust flow guards 25, and an extraction turbine 26. The sawdust exhaust system includes a turbine cover 27, an exhaust tube 07, an exhaust tube elbow 28, and a dust collection bag 21. When the blade 11 cuts the wood workpiece, a great amount of sawdust is generated in the sawdust generation region inside the blade housing 09 as shown in FIG. 3. The sawdust is spewed out in all direction. As the retractable blade guard 10 opens during cutting, the housing 09 can confine only a portion of the generated sawdust. To confine most the dust inside, the retractable dust guard 12 is added to further confine the sawdust within the sawdust generation region. Only a very small portion of the sawdust will escape from the confined space. With the extraction turbine 26 running, a negative pressure is generated in the sawdust generation region, and the sawdust is sucked through an opening 42 in the blade housing 09. The majority of sawdust is extracted from the sawdust generation region, then into the turbine chamber, and finally is blew into the dust exhaust tube 07 and collected in the sawdust collection bag 21 through the outlet of tube elbow 28. Changing and cleaning the dust collection bag frequently helps increase the efficiency of the dust extraction.

The escaped sawdust is collected by the suction channel 03. The suction channel 03 has the integrated channel separator 23, which splits the channel into an upper channel and a lower channel. The upper channel will collect the sawdust escaped from the gap between the blade housing 09 and the retractable dust guard 12. The lower channel will collect the saw dust falling into the slot in the base 02. The collected sawdust will pass through the suction tube 06, enter into the opening 42 of the blade housing through two dust flow guards 25.

To maximize the sawdust collection, three airflow guide fins 24 and the two dust flow guards 25 are located on the blade housing 09. The fins and guards can be located on the blade housing 09 by attaching or forming them onto the blade housing 09. The location and orientation of the fins can be optimized based on the detailed design of the blade housing 09.

Figure 5:
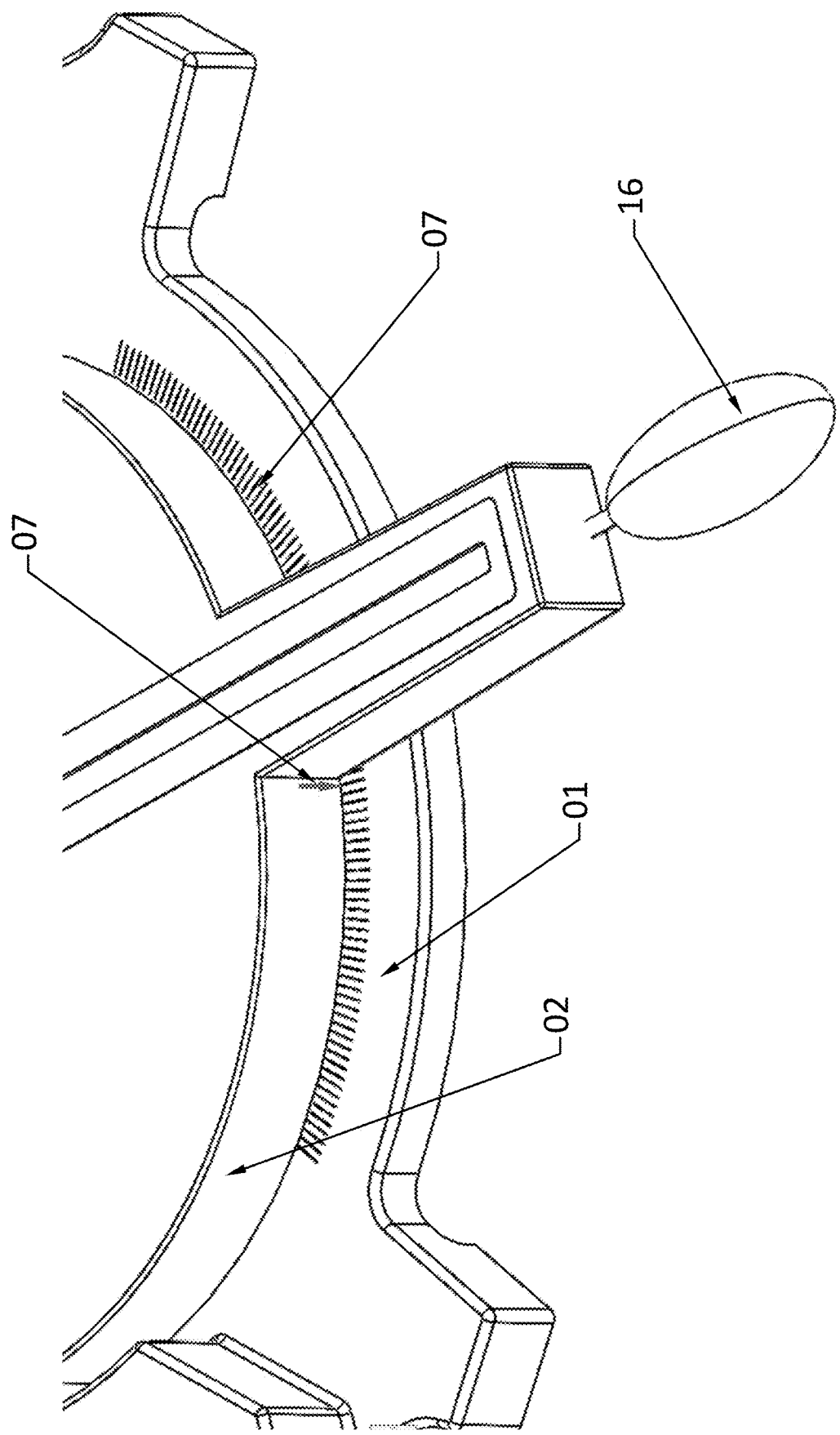
FIG. 5 presents an embodiment of the miter scale and its indicator.

FIG. 5 depicts an embodiment of a miter scale 29. The scale 29 can be inked on the base 01, or a separate scale can be attached to the base 01. A scale indicator can be inked or attached to the turn base so that the miter angle can be read easily. By pushing the miter level 16, the user can easily adjust the turn base to the desired angle.

Figure 6:
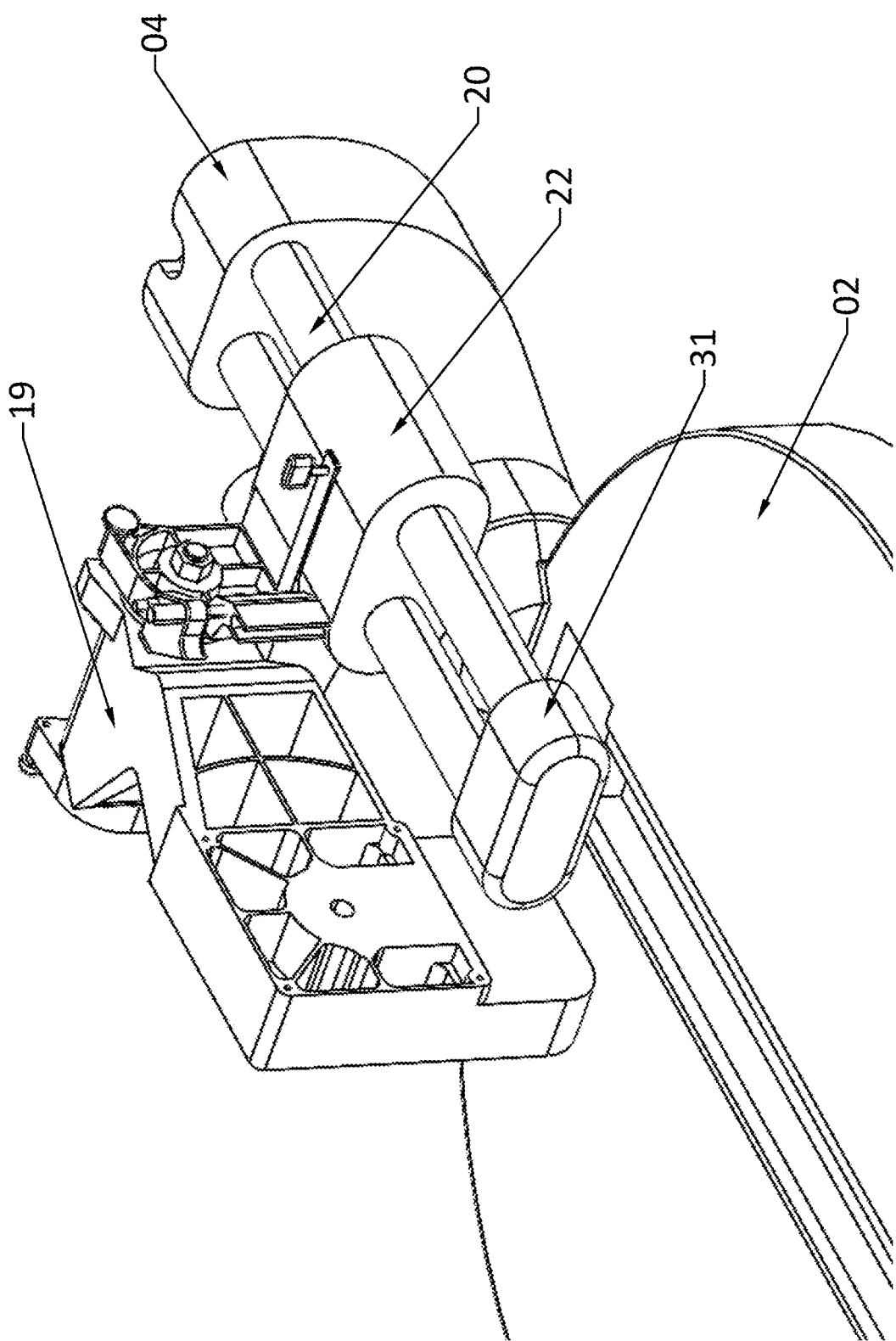
FIG. 6 presents an embodiment of the miter saw sliding system.

FIG. 6 depicts an embodiment of a sliding system. The sliding system is attached to the support arm 04. The sliding system includes two rails 20, a sliding bracket 22, and a sliding end block 31. The sliding bracket 22 can move along the rails to maximize the cutting length. The sliding end block 22 is used to prevent the sliding bracket 22 falling off the rails 20.

Figure 7:
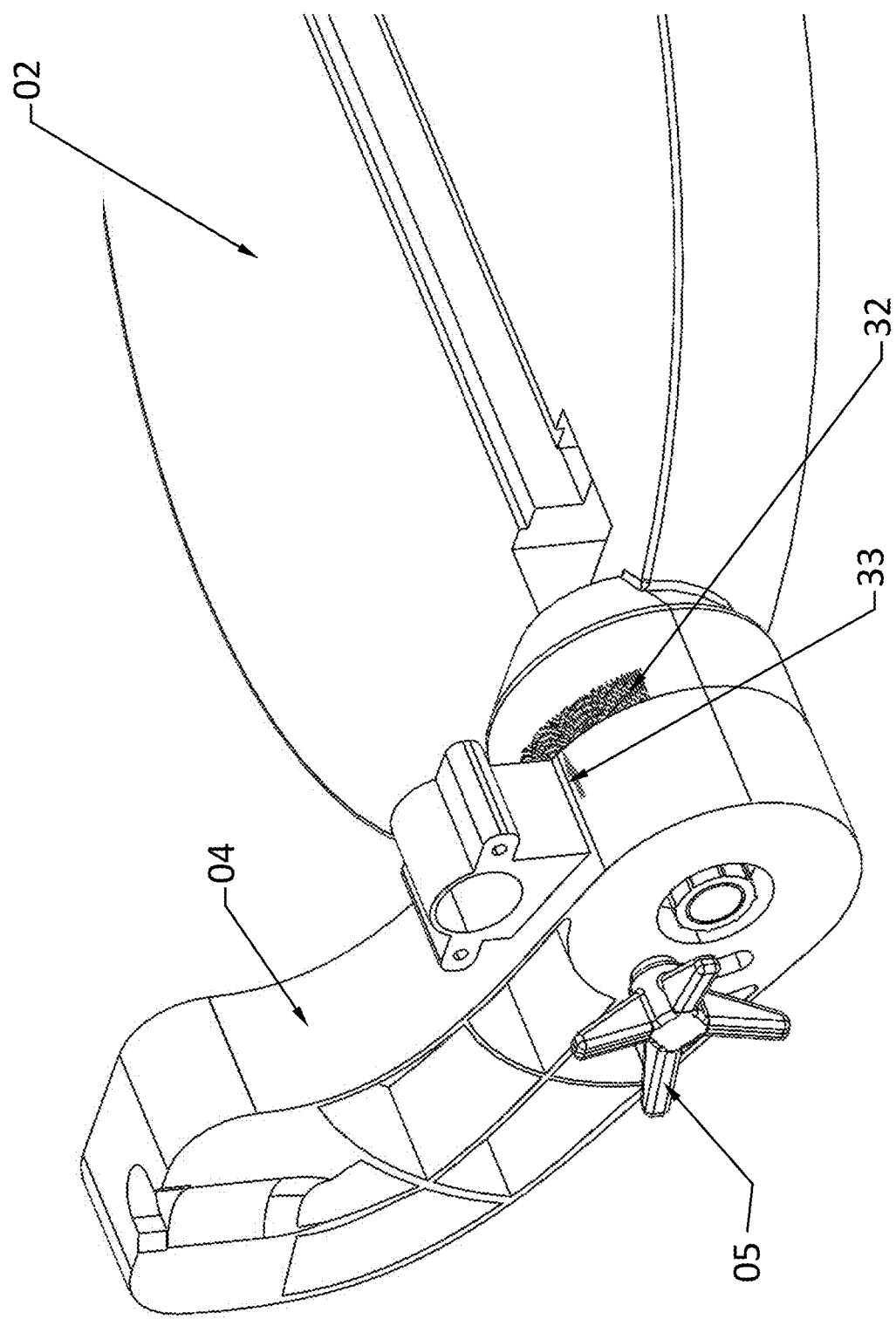
FIG. 7 presents an embodiment of the miter beveling/tilting mechanism and its indicator.

FIG. 7 depicts an embodiment of a beveling/tilting system. The beveling system includes a beveling scale 32 and a beveling scale indicator 33. The beveling scale 32 can be inked on the turn base 02, or a separate scale can be attached to the turn base 02. The beveling scale indicator 33 can be inked or attached to the support arm 04 so that the miter angle can be read easily. After tilting the support arm 04 to the desired beveling angle, the support clamp 05 is tightened to clamp the support arm 04 at the angle.

Figure 8:
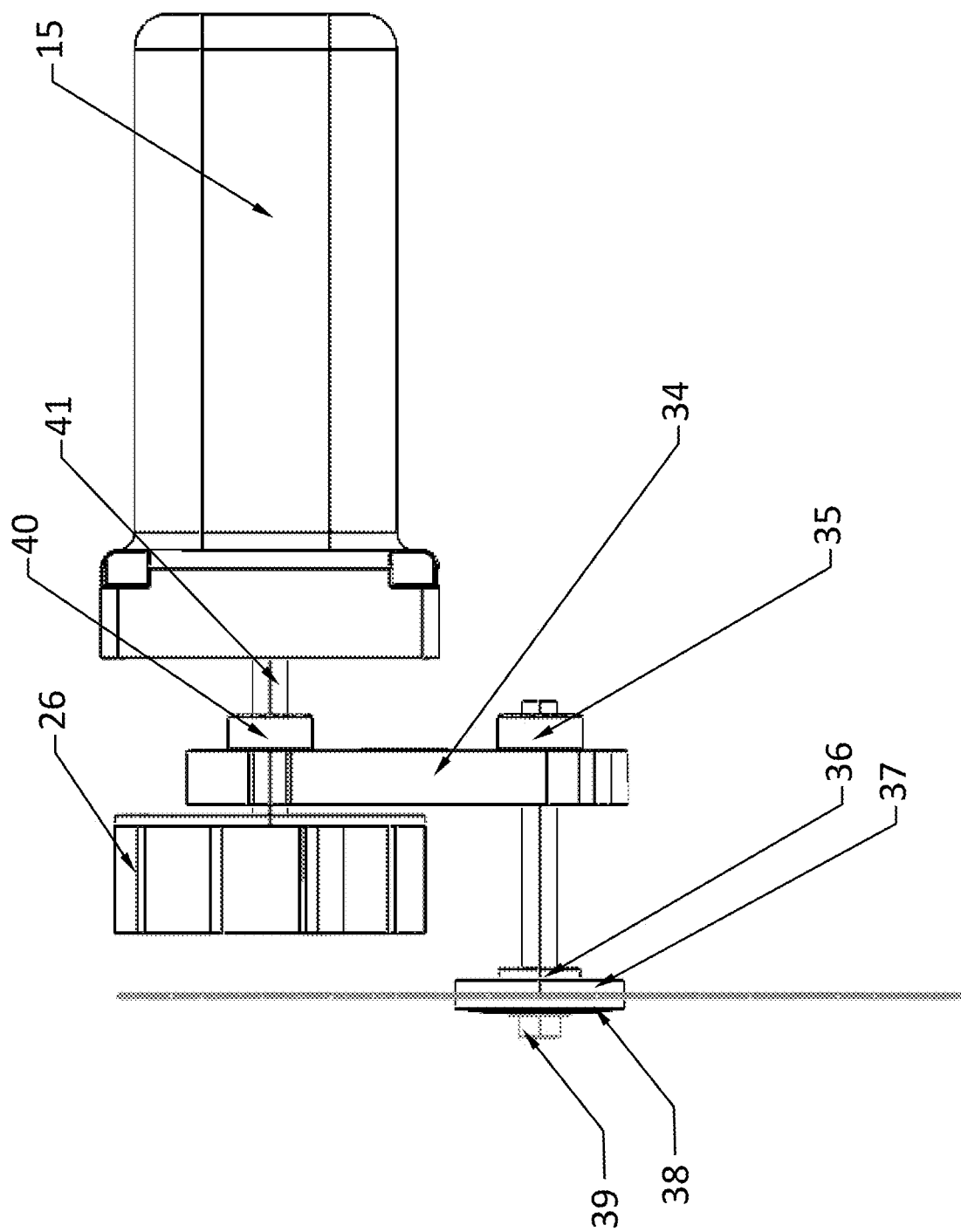
FIG. 8 presents an embodiment of the miter saw driving system.

FIG. 8 depicts an embodiment of a driving system for the blade 11 and the extraction turbine 26. The whole system is driven by a motor 15. The extraction turbine 26 can be directly mounted to the driving shaft 41 or through a belt system. The power can be transferred to the blade 11 through a gear box 34 or a belt. The blade 11 is fixed to the shaft 36 using a pair of disk clamps 38 and tightened by a bolt 39. To increase the system's stability, multiple bearings 35, 37, 40 can be used as necessary.

Although example assemblies, methods, systems have been described herein, the scope of coverage of this patent is not limited thereto. On the contrary, this patent covers every method, apparatus, and article of manufacture fairly falling within the scope of the appended claims either literally or under the doctrine of equivalents.

What is claimed is:

1. A miter saw, comprising:
   a blade;
   a motor configured to rotate the blade;
   a blade housing enclosing a portion of the blade on three sides;
   a sliding system configured to permit a human user to move the blade in a first horizontal direction to cut the workpiece and a second horizontal direction opposite from the first horizontal direction, wherein first side teeth of the blade facing the first horizontal direction are configured to cut a workpiece when the blade is rotating and moving in the first horizontal direction, and wherein the first side teeth of the blade generate and spread sawdust when the first side teeth of the blade are cutting the workpiece;
   a first guard extending below the blade housing and enclosing the first side teeth of the blade on three sides, wherein the first guard is configured to retract upward with respect to the blade housing to uncover a portion of the first side teeth of the blade that are cutting the workpiece while enclosing a remaining portion of the first side teeth of the blade that are above the workpiece, and wherein the first guard is configured to capture at least a portion of the sawdust spread by the blade in the first horizontal direction when the first side teeth of the blade are cutting the workpiece;
   a second guard extending below the blade housing and enclosing second side teeth of the blade, wherein the second guard is configured to retract upward with respect to the blade housing to accommodate the workpiece as the first side teeth of the blade are cutting the workpiece; and a vacuum generator configured to generate a vacuum, wherein the vacuum generator is in fluid communication with the blade housing through an opening in the blade housing such that the vacuum passes into the blade housing, wherein the first guard is maintained along the blade housing as the first guard retracts upward such that the vacuum passes from the blade housing into the first guard, and wherein the vacuum sucks the sawdust located inside the blade housing and the first guard into the opening when the first side teeth of the blade are cutting the workpiece.

2. The miter saw of claim 1 wherein the vacuum generator comprises an extraction turbine.

3. The miter saw of claim 1 wherein the motor is configured to also rotate the extraction turbine.

4. The miter saw of claim 1, further comprising sawdust flow guards disposed on an inner surface of the blade housing, wherein the sawdust flow guards direct flow of the sawdust within the blade housing toward the opening.

5. A miter saw, comprising:
a blade housing enclosing a portion of a blade on three sides, wherein the blade is movable in a first horizontal direction and a second horizontal direction, wherein first side teeth of the blade facing the first horizontal direction are configured to cut a workpiece when the blade is rotating and moving in the first horizontal direction, wherein the first side teeth of the blade generate and spread sawdust when the first side teeth blade are cutting a workpiece;
a first guard extending below the blade housing and enclosing the first side teeth of the blade on three sides, wherein the first guard is configured to retract upward with respect to the blade housing to uncover a portion of the first side teeth of the blade that are cutting the workpiece while enclosing a remaining portion of the first side teeth of the blade that are above the workpiece, and wherein the first guard is configured to capture at least a portion of the sawdust spread by the blade in the first horizontal direction when the first side teeth of the blade are cutting the workpiece;
a second guard extending below the blade housing and enclosing second side teeth of the blade, wherein the second guard is configured to retract upward with respect to the blade housing to accommodate the workpiece as the first side teeth of the blade are cutting the workpiece;
a vacuum generator configured to generate a vacuum, wherein the vacuum generator is in fluid communication with the blade housing through an opening in the blade housing such that the vacuum passes into the blade housing, wherein the first guard is maintained along the blade housing as the first guard retracts upward such that the vacuum passes from the blade housing into the first guard, and wherein the vacuum sucks at least some sawdust located inside the blade housing and the first guard into the opening when the first side teeth of the blade are cutting the workpiece; and
a motor configured to rotate the blade.

6. The miter saw of claim 5, further comprising an exhaust tube outside of the blade housing and in fluid communication with the opening, wherein the sawdust sucked by the vacuum into the opening is transferred away from the blade housing via the exhaust tube.

7. The miter saw of claim 5 wherein the vacuum generator comprises an extraction turbine.

8. The miter saw of claim 7 wherein the motor is configured to also rotate the extraction turbine.

9. The miter saw of claim 5, further comprising sawdust flow guards disposed on an inner surface of the blade housing, wherein the sawdust flow guards direct flow of the sawdust within the blade housing toward the opening.

10. The miter saw of claim 9, wherein the sawdust flow guards partially surround the opening thereby defining a sawdust flow region, wherein the saw further comprises sawdust flow guide fins disposed on the inner surface of the blade housing at an entrance of the sawdust flow region to direct the flow of the sawdust within the blade housing into the sawdust flow region.

11. The saw of claim 10, further comprising an exhaust tube outside of the blade housing and in fluid communication with the opening, wherein the sawdust sucked by the vacuum into the opening is transferred away from the blade housing via the exhaust tube.

12. The saw of claim 10, further comprising sawdust flow guards disposed on an inner surface of the blade housing, wherein the sawdust flow guards direct flow of the sawdust within the blade housing toward the opening.

13. The saw of claim 12, wherein the sawdust flow guards partially surround the opening thereby defining a sawdust flow region, wherein the saw further comprises sawdust flow guide fins disposed on the inner surface of the blade housing at an entrance of the sawdust flow region to direct the flow of the sawdust within the blade housing into the sawdust flow region.

14. A miter saw, comprising:
a blade housing enclosing a portion of a blade on three sides;
a sliding system configured to facilitate horizontal movement of the blade in a forward direction and a backward direction, wherein forward side teeth of the blade facing the forward direction are configured to cut a workpiece when the blade is rotating and moving horizontally in the forward direction, and wherein the forward side teeth of the blade generate and spread sawdust when the forward side teeth of the blade are cutting the workpiece;
a guard extending below the blade housing and enclosing the forward side teeth of the blade on three sides, wherein the guard is configured to retract upwards to uncover a portion of the forward side teeth of the blade that are cutting the workpiece while enclosing a remaining portion of the forward side teeth of the blade that are above the workpiece, and wherein the guard is configured to capture at least a portion of the sawdust spread by the blade in the forward direction when the forward side teeth of the blade are cutting the workpiece;
a vacuum generator configured to generate a vacuum, wherein the vacuum generator is in fluid communication with the blade housing through an opening in the blade housing such that the vacuum passes into the blade housing, wherein the guard is maintained along the blade housing as the guard retracts upwards such that the vacuum passes from the blade housing into the guard, and wherein the vacuum sucks at least a portion of the sawdust located inside the blade housing and the guard into the opening when the forward side teeth of the blade are cutting the workpiece; and
a motor configured to rotate the blade.

15. The miter saw of claim 14, further comprising an exhaust tube outside of the blade housing and in fluid communication with the opening, wherein the sawdust sucked by the vacuum into the opening is transferred away from the blade housing via the exhaust tube.

16. The miter saw of claim 14, further comprising sawdust flow guards disposed on an inner surface of the blade housing, wherein the sawdust flow guards direct flow of the sawdust within the blade housing toward the opening.

17. The miter saw of claim 16, wherein the sawdust flow guards partially surround the opening thereby defining a sawdust flow region, and wherein the miter saw further comprises sawdust flow guide fins disposed on the inner surface of the blade housing at an entrance of the sawdust flow region to direct the flow of the sawdust within the blade housing into the sawdust flow region.

18. The miter saw of claim 14, wherein the guard is a first guard, wherein the miter saw further comprises a second guard extending below the blade housing and enclosing second side teeth of the blade facing the backward direction, and herein the second guard is configured to retract upwards with respect to the blade housing to accommodate the workpiece as the first side teeth of the blade are cutting the workpiece.

19. The miter saw of claim 14 wherein the vacuum generator comprises an extraction turbine.

20. The miter saw of claim 19 wherein the motor is configured to also rotate the extraction turbine.

* * * * *